United States Patent [19]

Wood

[11] Patent Number: 5,066,160

[45] Date of Patent: Nov. 19, 1991

[54] BALL JOINT

[75] Inventor: Ruey E. Wood, Mount Clemens, Mich.

[73] Assignee: TRW Inc., Lyndhurst, Ohio

[21] Appl. No.: 524,129

[22] Filed: May 14, 1990

[51] Int. Cl.$^5$ .............................................. F16C 11/06
[52] U.S. Cl. .................................... 403/140; 403/138; 403/132
[58] Field of Search ......................... 403/127, 133–136, 403/138, 140–144, 50–51; 29/149.5 B

[56] References Cited

U.S. PATENT DOCUMENTS

| | | | |
|---|---|---|---|
| 1,898,100 | 2/1933 | Skillman | 403/139 X |
| 2,420,621 | 5/1947 | Ricks | 403/126 |
| 3,084,960 | 4/1963 | Lifka | 403/194 |
| 3,259,408 | 7/1966 | Herbenar | 403/138 |
| 3,290,074 | 12/1966 | Korecky | 403/132 |
| 3,547,474 | 12/1970 | Colletti | 403/23 |
| 3,843,272 | 10/1974 | Jorn | 403/132 |
| 3,846,032 | 11/1974 | Harada et al. | 403/140 |
| 4,017,197 | 4/1977 | Farrant | 403/132 X |
| 4,059,361 | 11/1977 | Allison | 403/141 X |
| 4,695,182 | 9/1987 | Wood, Jr. | 403/140 |
| 4,712,940 | 12/1987 | Wood, Jr. | 403/133 |
| 4,725,159 | 2/1988 | Wood, Jr. | 403/133 |
| 4,887,486 | 12/1989 | Wood, Jr. | 403/141 X |
| 4,890,949 | 1/1990 | Wood, Jr. | 403/140 X |

FOREIGN PATENT DOCUMENTS

| | | | |
|---|---|---|---|
| 636210 | 6/1986 | Japan | 403/140 |
| 1071509 | 12/1959 | Netherlands | 403/143 |
| 817027 | 7/1959 | United Kingdom | 403/134 |
| 829998 | 3/1960 | United Kingdom | 403/143 |
| 1177973 | 1/1970 | United Kingdom | 403/143 |

Primary Examiner—Peter M. Cuomo
Attorney, Agent, or Firm—Tarolli, Sundheim & Covell

[57] ABSTRACT

A ball joint has a folded, stamped metal housing with increased strength and a seal to contain a liquid lubricant from leaking out through the housing seam. An annular steel support seat member reinforces the stamped housing structure and has an outer flange received in a recess in the housing to cover the seam.

9 Claims, 6 Drawing Sheets

BALL JOINT

FIELD OF THE INVENTION

The present invention relates to a ball joint, and particularly to a ball joint including a ball stud and a housing for the ball stud.

BACKGROUND OF THE INVENTION

Ball joints generally comprise a stud which includes a shank and a ball end, and a housing in which the ball end is seated. The ball joint permits the ball end and shank to rotate about the stud axis, as well as to swing or pivot with respect to the stud axis. The housing usually contains a pair of bearing seat members. The bearing seat members have spherical surfaces, and are positioned within the housing in axially opposed relationship to provide bearing surfaces against which the surface of the ball end can slide. A spring biases one of the bearing seat members against the ball end to hold the ball end firmly between the bearing seat members.

The housings of such ball joints vary in form. Solid unitary housings are known which are machined forgings or castings. Also, housings are known which are formed from one or more stamped metal pieces. For example, U.S. Pat. No. 3,259,408 to Herbenar shows a ball joint with a unitary solid housing. A lubricant is sealed within the housing by means of a plug at one end of the housing, and a boot seal extends between the stud shank and the other end of the housing.

U.S. Pat. No. 2,420,621 to Ricks shows a ball joint housing formed from a piece of sheet metal stamped into a cup shape. The cup-shaped housing is clinched or spun into a spherical shape to enclose the bearing seat members by folding sections of the housing across an open slot in the sheet metal material. This type of housing suffers from the disadvantage of having a seam through which a lubricant could leak at the closed slot.

Another type of ball joint is shown in U.S. Pat. No. 1,898,100 to Skillman wherein a housing is formed from a stamped sheet metal piece having two sections. The two sections are pivoted about a fold line to bring cup-shaped portions of the two sections into overlying relationship. The overlying cup-shaped portions of the housing define a chamber for the ball end of the stud. A seam extends around the chamber between the overlying edges of the cup-shaped portions. This type of housing structure also suffers from the disadvantage of having a seam through which a liquid lubricant could leak. Furthermore, stamped sheet metal structures are generally not as strong as solid forgings or castings.

SUMMARY OF THE INVENTION

In accordance with a preferred embodiment of the invention, a ball joint comprises a stud member having an axis, a generally spherical ball end, and a shank extending axially from the ball end. A housing surrounds the ball end. The housing comprises a first section having a first surface, and a second section having a second surface. The first and second surfaces are in overlying relationship to define a seam extending transversely with respect to the axis. A support seat member is provided in the housing. The support seat member has a radially inner bearing surface slidably engaging the ball end, and a radially outer surface extending across and along the length of the seam. The support seat member serves to block a liquid lubricant from leaking out through the seam.

Preferably, the housing has an inner surface with a recess, and the seam borders the recess. The radially outer surface of the support seat member preferably includes a flange extending radially outwardly into the recess. The support seat member thereby rigidly engages the surrounding housing to strengthen the sectional structure of the housing, and provides a tight seal against leakage at the seam.

In accordance with another preferred embodiment of the invention, a socket assembly includes a housing which comprises an axis, a first section having a first surface, and a second section having a second surface. The first and second surfaces converge to define a seam extending transversely with respect to the axis. A support seat member in the housing has a radially inner bearing surface slidably engaging the ball end of a stud, and a radially outer surface extending between the converging housing surfaces. The support seat member blocks leakage of a lubricant outwardly through the seam.

BRIEF DESCRIPTION OF THE DRAWINGS

These and other features of the present invention will become apparent to those skilled in the art upon reading the following description of a preferred embodiment in view of the accompanying drawings, wherein.

DESCRIPTION OF PREFERRED EMBODIMENTS

Figure 1:
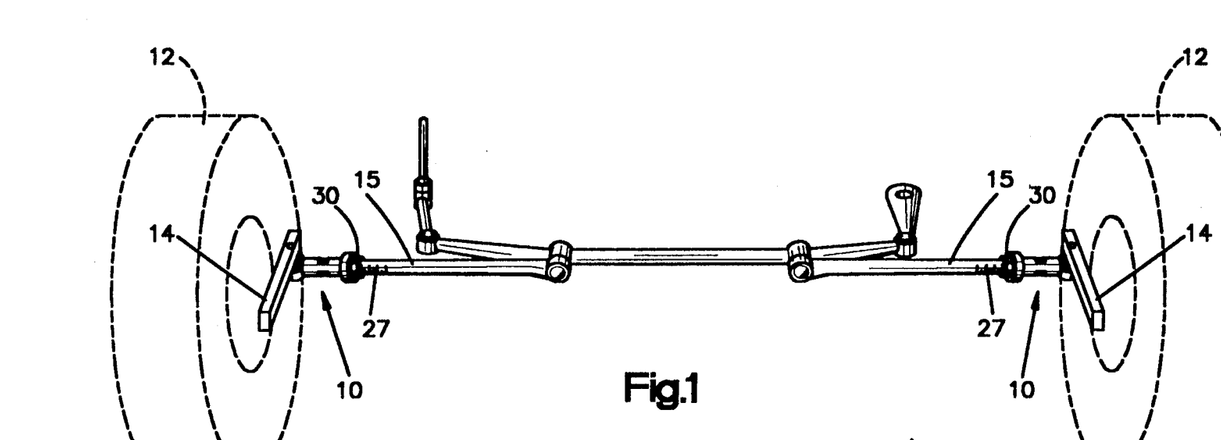
FIG. 1 is a schematic view of a vehicle steering linkage including a ball joint in accordance with the present invention.

In FIG. 1 there is shown a schematic view of a portion of a vehicle steering system including a ball joint 10 according to a preferred embodiment of the present invention. The vehicle steering system comprises a steerable wheel 12 with a steering arm 14, a tie rod 15, and the ball joint 10 connecting the steering arm 14 with the tie rod 15.

Figure 2:
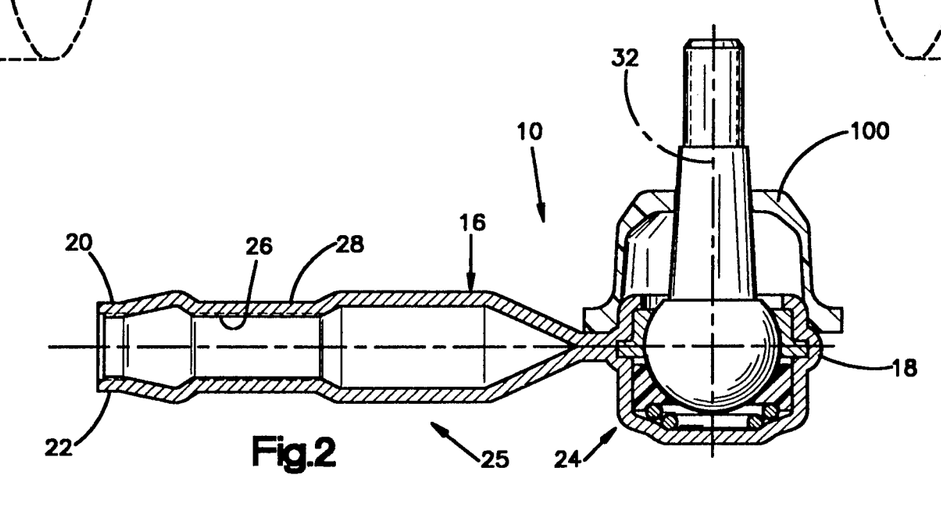
FIG. 2 is a cross sectional view of the ball joint shown in FIG. 1.

Referring now to FIG. 2, the ball joint 10 comprises a housing 16. The housing 16, in the preferred embodiment shown in FIG. 2, is formed from a stamped metal blank which is a single piece of sheet metal folded about a centrally located hinge portion 18 to bring opposite housing sections 20 and 22 into overlying relationship. The ball joint 10 has a socket end 24 and a sleeve end 25. The sleeve end 25 has internal threads 26 for engagement with external threads 27 on the tie rod 15. A nut 30 holds the tie rod 15 in place within the sleeve end 25 as shown in FIG. 1. The sleeve end 25 of the ball joint 10 can be formed specifically in accordance with the invention disclosed in co-pending patent application Ser. No. 444,563, filed Dec. 1, 1989, entitled "Turnbuckle Assembly", assigned to the present assignee.

The socket end 24 of the ball joint 10 has an axis 32, and comprises overlying cup-shaped portions of the two housing sections 20 and 22. The first housing section 20 includes a first cup-shaped portion 34 having a first edge surface 38, a circular stud opening surface 39, and a generally cylindrical inner surface 40 extending from the stud opening surface 39 to the first edge surface 38. The inner surface 40 includes an annular shoulder 41 spaced axially from the first edge surface 38 by a relatively narrow cylindrical surface portion 42.

The second housing section 22 includes a second cup-shaped portion 44 with a second edge surface 48 and a closed end 50. A generally cylindrical inner surface 52 of the second cup-shaped portion 44 similarly includes an annular shoulder 54 spaced axially from the second edge surface 48 by a relatively narrow cylindrical surface portion 56.

Figure 3:
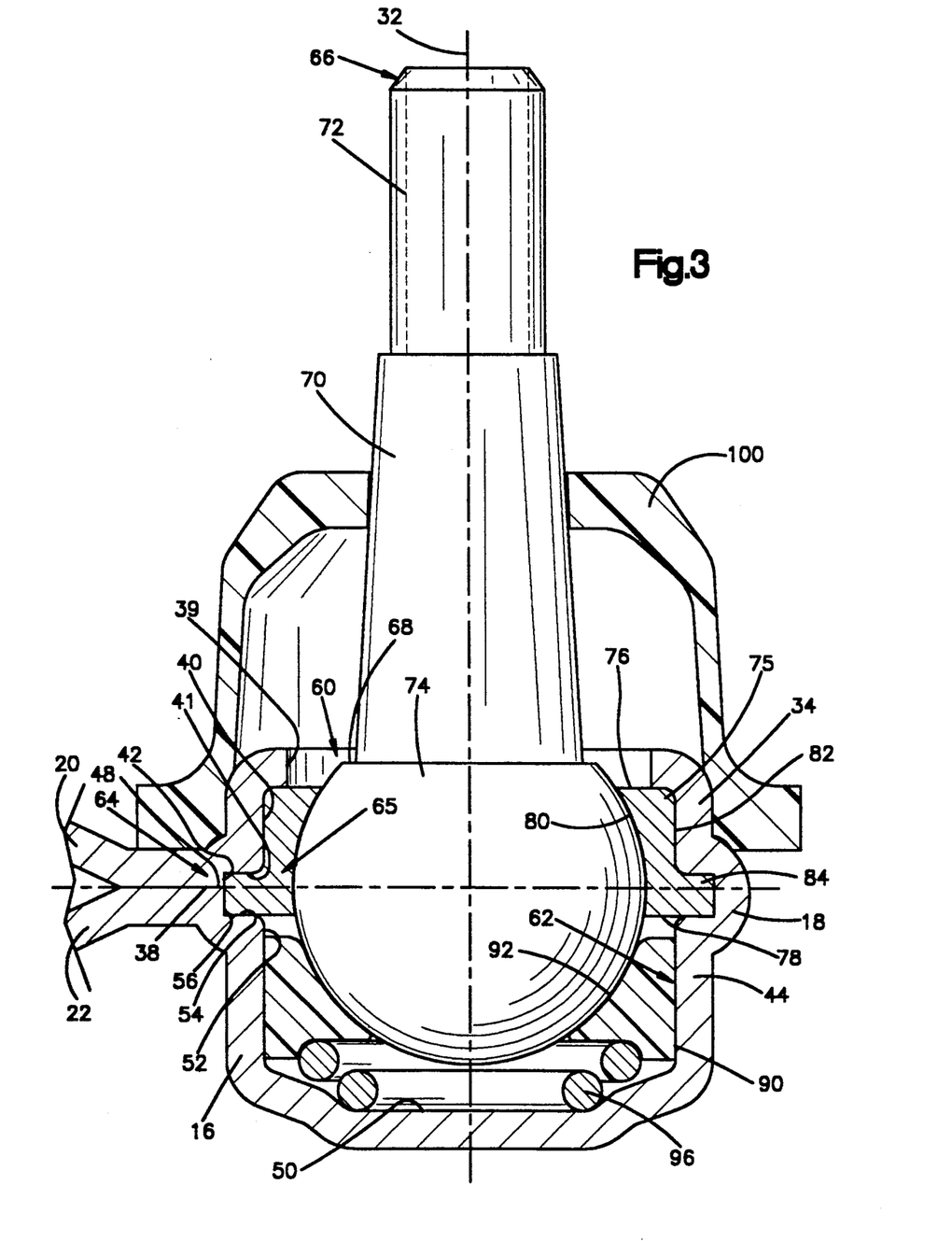
FIG. 3 is an enlarged partial view of the ball joint of FIG. 2.

Placement of the first housing section 20 in a closed position overlying the second housing section 22 defines a chamber 60 with a generally cylindrical inner surface 62. The inner surfaces 40 and 52 of the first and second cup-shaped portions 34 and 44 define axial sections of the chamber surface 62 on opposite sides of a seam 64 which is, in turn, defined by the overlying edge surfaces 38 and 48 of the overlying cup-shaped portions 34 and 44. The seam 64 is thus defined by two surfaces of a single piece of sheet metal. Preferably, the overlying edge surfaces 38 and 48 are in abutting relationship. The opposing annular shoulders 41 and 54, and the associated cylindrical surface portions 42 and 56, define a recess 65 in the chamber surface 62. The seam 64 borders the recess 65, and extends circumferentially between opposite ends of the foldable hinge portion 18.

The ball joint 10 further comprises a stud 66 having a generally spherical ball end 68 and a partially tapered shank 70. The stud 66 has a centered position in which the shank 70 is coaxial with the housing axis 32, and has threads 72 at the shank 70 for connection to the steering arm 14 as shown in FIG. 1. The ball end 68 has a nearly complete spherical surface 74, and is supported in the housing 16 to rotate about the axis 32 as well as to swing through a clearance between the shank 70 and the stud opening surface 39.

A generally annular rigid support seat member 75 has a first end surface 76 defining a first open end of the support seat member 75, and a second end surface 78 defining a second open end. The support seat member also has a radially inner bearing seat surface 80, and a radially outer surface 82. The bearing seat surface 80 extends around and slidably engages the spherical surface 74 of the ball end 68, and the radially outer surface 82 has a contour adapted to register with the contour of the chamber surface 62. Specifically, the radially outer surface 82 defines a circular flange 84 which is closely received within the recess 65. The flange 84 extends circumferentially adjacent to the seam 64, and axially traverses the seam 64. Preferably, the flange 84 extends radially into contact with the cylindrical surface portions 42 and 56. The support seat member 75 isolates the seam 64 from the chamber 60 to seal the chamber surface 62. A liquid lubricant contained within the chamber 60 is blocked from leaking out of the sectional housing 16 through the seam 64. Furthermore, the support seat member 75 strengthens the sectional housing 16 by providing an internal support for the housing sections 20 and 22. The support seat member 75 is preferably formed of a rigid metal material such as steel.

A plastic wear take-up seat 90 has an annular bearing seat surface 92 slidably engaging the surface 74 of the ball end 68, and is axially shiftable in the second cup-shaped portion 44 of the housing 16. A coil spring 96 biases the wear take-up seat 90 away from the closed end 50 toward the support seat member 75 to hold the ball end 68 firmly seated in the housing 16.

A generally conical, flexible elastomeric boot seal 100 extends between the tapered shank 70 and the first housing section 20 to cover the stud opening defined by the surface 39.

Figure 4:
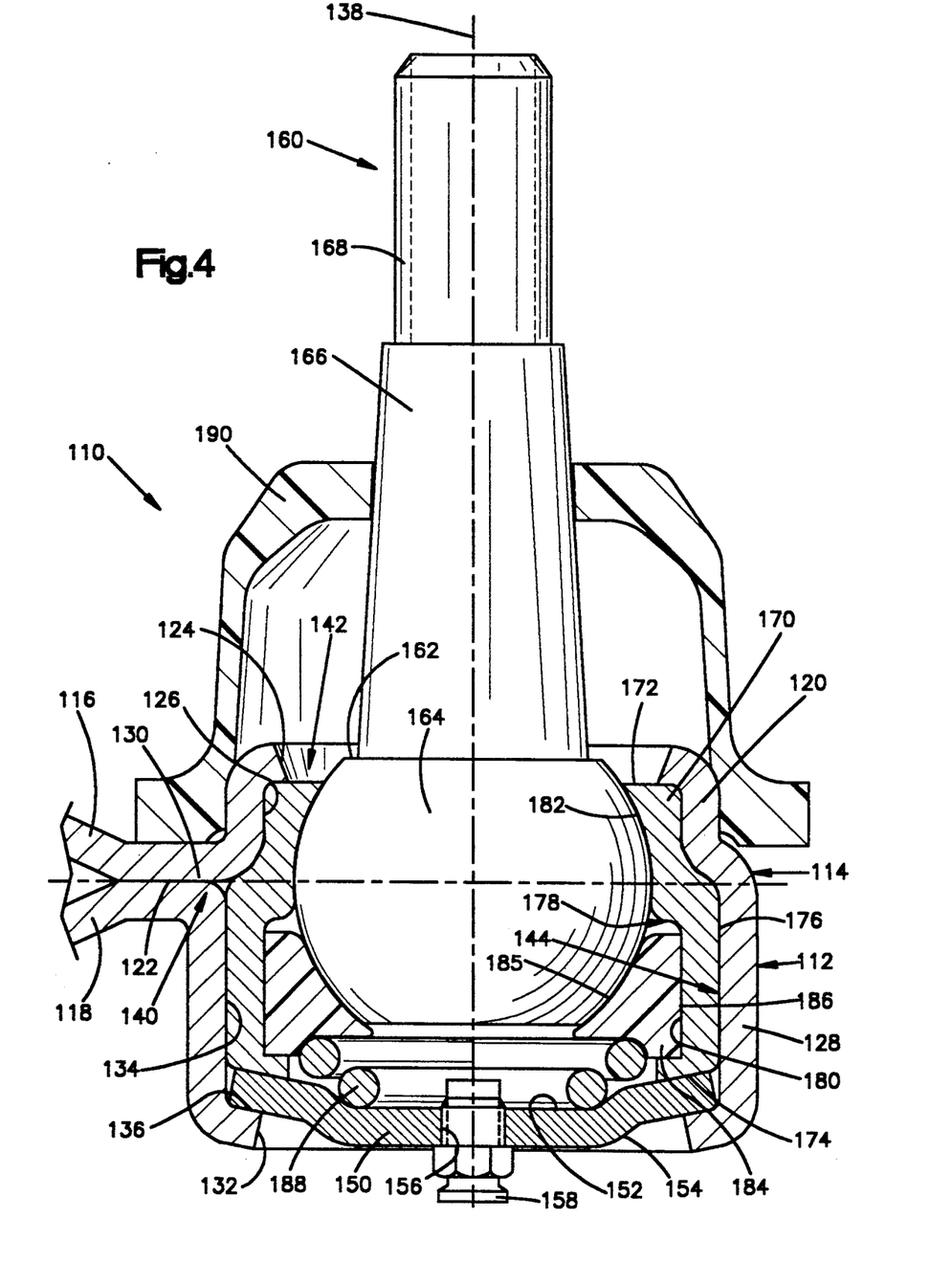
FIG. 4 is a partial cross sectional view of a ball joint in accordance with an alternate embodiment of the invention.

An alternate embodiment of the present invention is shown in FIG. 4 as a ball joint 110. The ball joint 110 comprises a housing 112. The housing 112 is formed from a stamped metal blank which is folded about a centrally located hinge portion 114 to bring two opposite housing sections 116 and 118 into overlying relationship. The first housing section 116 includes a first cup-shaped portion 120. The first cup-shaped portion 120 includes a first edge surface 122, a frustoconical stud opening surface 124, and an inner surface 126 extending from the stud opening surface 124 to the first edge surface 122.

The second housing section 118 includes a second cup-shaped portion 128. The second cup-shaped portion 128 includes a second edge surface 130, a surface 132 defining an opening, and an inner surface 134 extending between the surface 132 and the second edge surface 130. The inner surface 134 includes an annular shoulder 136. The first and second cup-shaped portions 120 and 128 of the housing 112 have a common axis 138.

Placement of the first housing section 116 in a closed position overlying the second housing section 118 moves the first and second cup-shaped portions 120 and 128 into adjacent positions with the first and second edge surfaces 122 and 130 in overlying, abutting relationship to define a seam 140. The seam 140 is thus defined by two surfaces of a single piece of sheet metal, as shown in FIG. 4. The adjacent cup-shaped portions 120 and 128 of the housing 112 define a chamber 142 with a surface 144 which is defined by the axially adjacent inner surfaces 126 and 134. The seam 140 extends circumferentially around the surface 144 of the chamber 142 between the ends of the hinge portion 114 of the housing 112.

The ball joint 110 also includes a grease plug 150 having an inside surface 152 and an outside surface 154. The grease plug 150 is received within the opening defined by the surface 132, with the outside surface 154 of the grease plug 150 resting on the annular shoulder 136. The grease plug 150 includes a threaded grease opening 156 which is closable by a threaded plug 158.

A stud 160 is received in the housing 112. The stud 160 comprises a generally spherical ball end 162 having a nearly complete spherical surface 164, and a partially tapered shank 166 extending axially from the ball end 162. The shank 166 has threads 168 for connection of the shank 166 to a steering arm of a vehicle steering assembly. The stud 160 is supported in the housing 112 to rotate about the axis 138 and to swing through a clearance between the shank 166 and the stud opening surface 124.

A generally cylindrical support seat member 170 is received in the housing 112. The support seat member 170 has a first end surface 172 adjacent to the stud opening surface 124, and a second end surface 174 abutting against the inside surface 152 of the grease plug 150. The support seat member 170 also has an outer surface 176 with a contour adapted to register with the contour of the chamber surface 144, and an inner surface 178. The inner surface 178 of the support seat member 170 includes a cylindrical portion 180, and a spherically contoured bearing portion 182 which slidably engages the spherical surface 164 of the ball end 162. The support seat member 170 blocks leakage of a lubricant through the seam 140, and is preferably formed of steel in order to maximize the underlying structural support which the support seat member 170 provides for the sectional structure of the housing 112.

The ball joint 110 also includes a plastic wear take-up seat 184. The plastic wear take-up seat 184 has an annular bearing seat surface 185 engaging the spherical surface 164 of the ball end 162, and a radially outer cylindrical surface 186 which is flush with the cylindrical portion 180 of the inner surface 178 of the steel support seat member 170. The plastic wear take-up seat 184 is axially shiftable within the housing 112, and is biased toward the first cup-shaped portion 120 of the housing 112 by a coil spring 188 in order to hold the ball end 162 of the stud 160 firmly seated in the housing 112.

A boot seal 190 is received on the socket assembly 110 to provide a seal in a conventional manner.

Figure 5:
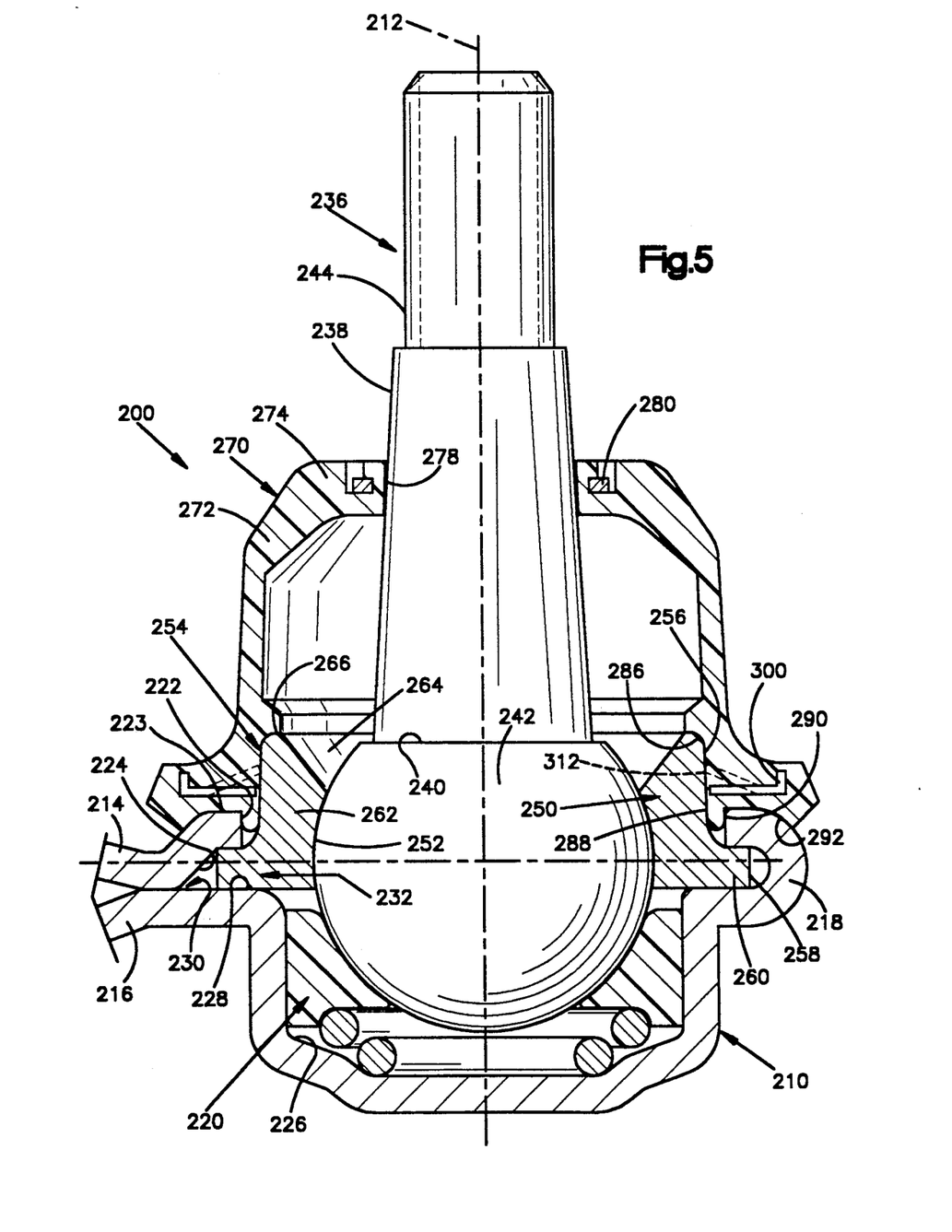
FIG. 5 is a partial cross sectional view of a ball joint in accordance with another alternate embodiment of the invention.

Another alternate embodiment of the invention is shown in FIG. 5. As shown in FIG. 5, a ball joint 200 includes a housing 210 which comprises an axis 212, two housing sections 214 and 216, and a hinge portion 218 connecting the two housing sections 214 and 216. The two housing sections 214 and 216 are in overlying relationship to define a chamber 220 within the housing 210.

The first housing section 214 has a cylindrical surface 222 defining an opening, an outer housing surface 223, and a first inner surface 224. The second housing section 216 is cup-shaped, and includes a second inner surface 226 surrounded by an annular edge surface 228. The first inner surface 224 of the first housing section 214 and the annular edge surface 228 of the second housing section 216 converge as shown in FIG. 5 to define a seam 230 and a circumferentially extending recess 232. The seam 230 is thus defined by two surfaces of a single piece of sheet metal, as shown in FIG. 5. The seam 230 extends around the chamber 220 bordering the recess 232 between the ends of the hinge portion 218 of the housing 210.

A stud 236 is received in the housing 210. The stud 236 comprises a shank 238, and a ball end 240 having a spherically contoured surface 242. The stud 236 has threads 244 at the shank 238 for connection of the stud 236 to a steering arm of a vehicle steering assembly.

A generally annular support seat member 250, preferably formed of steel, is received in the housing 210. The support seat member 250 has a radially inner bearing seat surface 252 slidably engaged with the spherically contoured surface 242 of the ball end 240, and has a radially outer surface 254. The radially outer surface 254 includes a cylindrical portion 256, and a portion 258 which defines a circular flange 260. The flange 260 extends radially into the recess 232 to hold the support seat member 250 firmly in place in the housing 210, and extends axially between the converging surfaces 224 and 228 to block leakage of a lubricant toward the seam 230.

An outer portion 262 of the support seat member 250 extends axially from the opening defined by the cylindrical surface 222 of the housing 210. The outer portion 262 includes a frustoconical surface 264 and an annular outer surface 266. The frustoconical surface 264 of the support seat member 250 serves as a stop surface to limit swinging movement of the stud 236. The outer surfaces 254 and 266 of the support seat member 250, and the surfaces 222 and 223 of the housing 210, serve as mounting surfaces for a boot seal 270.

Figure 6:
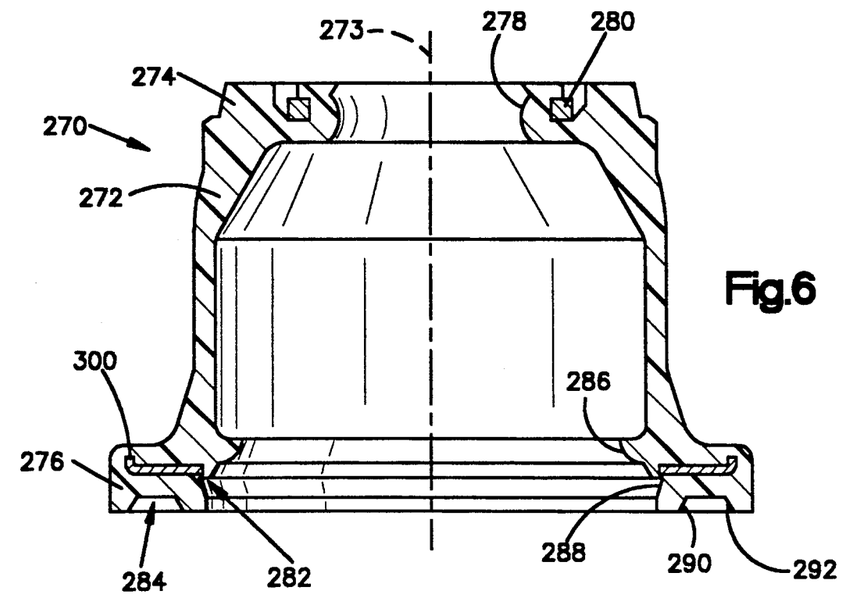
FIG. 6 is a cross sectional view of a component of the ball joint of FIG. 5.

Referring now to FIG. 6, the boot seal 270 comprises an elastomeric sleeve 272 having an axis 273, a first end portion 274, and a second end portion 276. The first end portion 274 of the sleeve 272 has a surface 278 which defines a circular opening receivable over the shank 238 of the stud 236. A split ring 280 is received within the first end portion 274 of the sleeve 272 to clamp the surface 278 against the shank 238.

The second end portion 276 of the sleeve 272 has an inner surface 282 and an outer surface 284. The inner and outer surfaces 282 and 284 of the second end portion 276 of the sleeve 272 have contours adapted to register with the contours of the mounting surfaces on the housing 210 and the support seat member 250. Specifically, the inner surface 282 has a portion 286 adapted to register with the annular outer surface 266 of the support seat member 250, and has a portion 288 adapted to register with the cylindrical outer surface portion 256 of the support seat member 250. The outer surface 284 of the sleeve 272 has a portion 290 adapted to register with the cylindrical housing surface 222, and has a portion 292 adapted to register with the outer housing surface 223.

Figure 7:
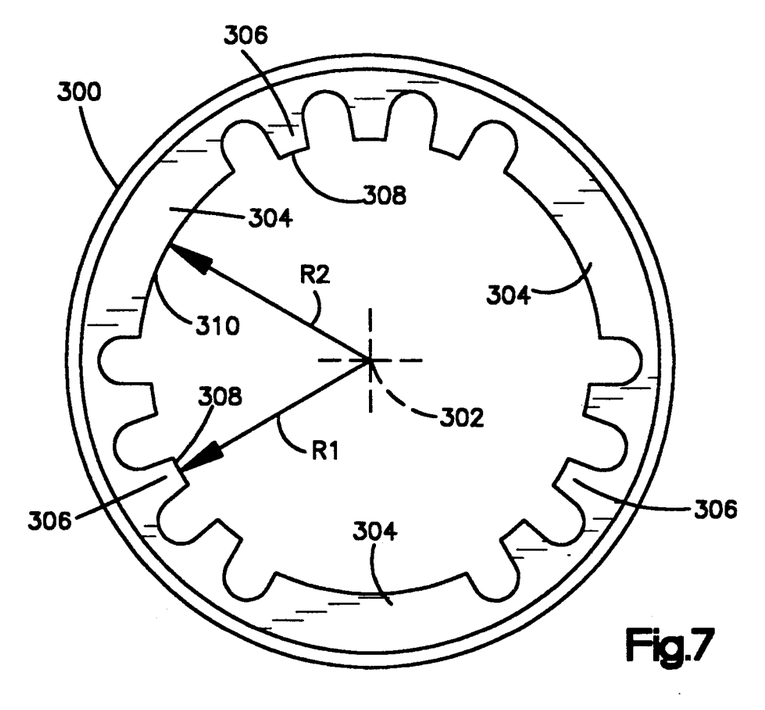
FIG. 7 is a top view of a part of the component of FIG. 6.

The second end portion 276 of the sleeve 272 includes a metal retainer ring 300. As shown in FIG. 7, the retainer ring 300 has an axis 302, arcuate segments 304, and groups of radial projections 306 spaced apart by the arcuate segments 304. The radial projections 306 are resiliently flexible axially, whereas the arcuate segments 304 are rigid. The radial projections 306 have end surfaces 308 with a curvature defining a first inside radius R1 of the retainer ring 300, and the arcuate segments 304 have edge surfaces 310 with a curvature defining a second inside radius R2 of the retainer ring 300. The second inside radius R2 is slightly greater than the first inside radius R1, and is approximately equal to the diameter of the cylindrical portion 256 of the radially outer surface 254 of the support seat member 250.

As shown in FIG. 6, the retainer ring 300 is embedded within the second end portion 276 of the sleeve 272. As the second end portion 276 of the sleeve 272 is moved axially into the position shown in FIG. 5, the radial projections 306 are forced to flex axially into positions wherein the corners 312 of the radial projections 306 are locked against the cylindrical outer surface portion 256 of the support seat member 250 to retain the boot seal 270 in place.

Figure 8:
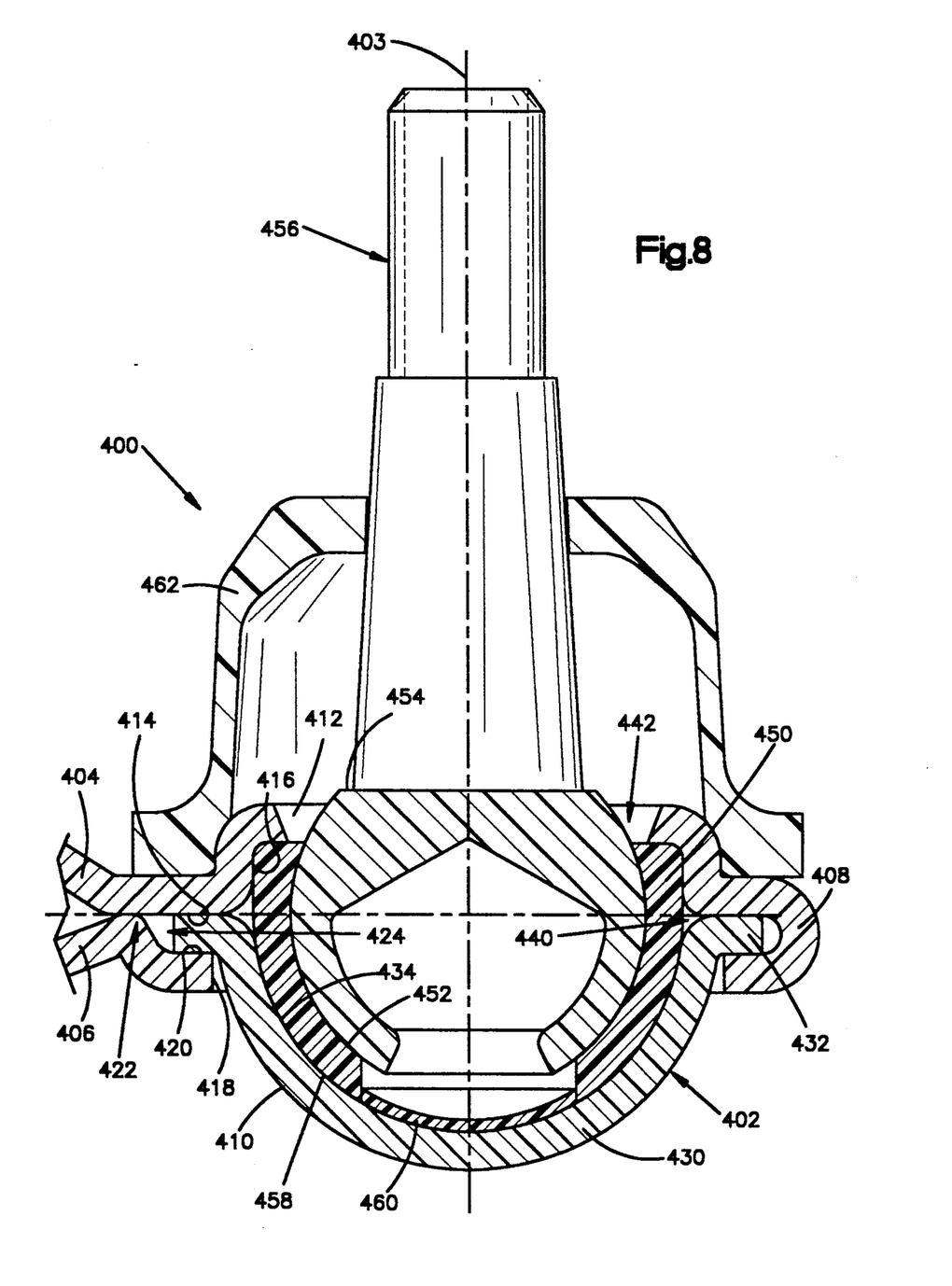
FIG. 8 is a partial cross sectional view of a ball joint in accordance with yet another alternate embodiment of the invention.

A ball joint 400 in accordance with yet another alternate embodiment of the invention is shown in FIG. 8. The ball joint 400 includes a housing 402. The housing 402 has an axis 403, first and second housing sections 404 and 406 which are joined by a hinge portion 408, and a third housing section 410 which is clamped to the first and second housing sections 404 and 406.

The first housing section 404 includes a frustoconical surface 412 defining a stud opening, an annular edge surface 414, and a first inner surface 416 extending between the frustoconical surface 412 and the edge surface 414. The second housing section 406 includes a cylindrical surface 418 defining an opening, and a second inner surface 420. The edge surface 414 of the first housing section 404 and the second inner surface 420 of the second housing section 406 converge as shown in FIG. 8 to define an outer seam 422 bordering a circumferentially extending recess 424. The outer seam 422 is thus defined by two surfaces of a single piece of sheet metal, as shown in FIG. 8. The outer seam 422 extends around the recess 424 between the ends of the hinge portion 408.

The third housing section 410 includes a spherically inclined portion 430 and a circular flange portion 432. The flange portion 432 is received in the recess 424, whereby the third housing section is firmly clamped to the first and second housing sections 404 and 406. The spherically inclined portion 430 of the third housing section 410 has a third inner surface 434 which slopes radially outwardly to the flange portion 432. The third inner surface 434 and the first inner surface 416 thus converge to define an inner seam 440, and together define a chamber 442 within the housing 402. The inner seam 440 extends entirely around the chamber 442.

A rigid support seat member 450 is received in the chamber 442. The support seat member 450 has a radially inner bering seat surface 452 which is slidably engaged with the surface of a ball end 454 of a stud 456. The support seat member 450 also has a radially outer surface 458 which is firmly engaged with the housing 402. The radially outer surface 458 traverses the inner seam 440 axially, and extends circumferentially along the length of the inner seam 440. The support seat member 450 thereby blocks leakage of a lubricant outwardly through the inner seam 440.

The ball joint 400 further includes a centering piece 460 for holding the support seat member 450 firmly in place in the chamber 442. As shown in FIG. 8, the components of the ball joint 400 thus far described are formed of a plastic material.

A boot seal 462 is received on the first housing section 404 in a conventional manner.

From the above description of the invention, those skilled in the art will perceive improvements, changes and modifications. Such improvements, changes and modifications within the skill of the art are intended to be covered by the appended claims.

Having described the invention, the following is claimed;

1. A ball joint comprising:
a stud having a ball end and a shank extending from said ball end along an axis of said stud;
a housing containing said ball end, said housing comprising a single piece of sheet metal having a first surface and a second surface, said piece of sheet metal being folded to place said first and second surfaces in overlying relationship to define a seam therebetween, said seam having a length extending circumferentially about said axis; and
a rigid support seat member received in said housing, said support set member having a radially inner surface slidably engaging said ball end and having a radially outer surface portion extending axially across said seam and coextensively with said seam about said axis.

2. A ball joint as defined in claim 1 wherein said piece of sheet metal comprises a first portion having said first surface, a second portion having said second surface, and an inner surface defined in part by each of said first and second portions, said inner surface of said piece of sheet metal defining a chamber containing said ball end and defining a radial recess extending circumferentially about said axis, said seam bordering said recess, said radially outer surface portion of said support seat member being located on a flange extending circumferentially in said recess, said piece of sheet metal being folded around said flange to clamp said flange in said recess whereby said flange provides underlying structural support for said housing and blocks leakage of a lubricant from said chamber outward through said seam.

3. A ball joint as defined in claim 1 wherein said radially outer surface portion of said support seat member is cylindrical and has portions located on opposite axial sides of said seam.

4. A ball joint as defined in claim 1 further comprising a movable seat member having a surface slidably engaged with said ball end, and means for biasing said movable seat member along said axis, said support seat member having a generally cylindrical shape with said inner surface extending circumferentially around the inside of said support seat member, extending axially from said ball end over said movable seat member, and extending circumferentially around the outside of said movable seat member.

5. A ball joint comprising:
a housing comprising a single piece of sheet metal having a cup-shaped first portion with a first surface, a cup-shaped second portion with a second surface, and a hinge portion connecting said first and second portions, said first and second portions being relatively pivoted about said hinge portion into an overlying relationship to define a chamber with an axis, said surfaces being in overlying relationship to define a seam extending circumferentially about said axis;
a stud having a ball end in said chamber and a shank extending from said ball end; and
a rigid support seat member received in said chamber, said support seat member having a radially inner bearing surface slidably engaging said ball end and a radially outer surface portion extending axially across said seam and coextensively with said seam about said axis.

6. A ball joint as defined in claim 5 wherein said first and second surfaces of said piece of sheet metal are in abutting relationship to defined said seam at the interface thereof.

7. A ball joint as defined in claim 3 wherein said piece of sheet metal defines a radial recess extending circumferentially about said chamber, said seam bordering said recess, said radially outer surface portion of said support seat member being located on a flange extending circumferentially in said recess, said first and second portions of said piece of sheet metal being relatively pivoted about said hinge portion into positions clamping said flange between said first and second portions, whereby said flange reinforces said housing and blocks leakage of a lubricant from said chamber outward through said seam.

8. A ball joint as defined in claim 5 wherein said radially outer surface portion of said support seat member is cylindrical and has portions located on opposite axial sides of said seam.

9. A ball joint comprising:
a stud having a ball end and a shank extending from said ball end;

a housing comprising a first section with a first opening, a second section with a second opening, a hinge section connecting said first and second sections, and a third section having a cup shape with a circular flange, said first and second sections being relatively pivoted about sad hinge section into an overlying relationship, said third section extending through said second opening with said flange clamped between said first and second sections, said third section and said first section defining a chamber having an axis, said chamber containing said ball end with said shank extending outward from said first opening, said third section and said first section further defining a seam extending circumferentially about said chamber and radially from said chamber; and a rigid support seat member received in said chamber, said support seat member having a radially inner surface slidably engaged with said ball end, and a radially outer surface portion extending axially across said seam and coextensively with said seam about said chamber.

* * * * *

UNITED STATES PATENT AND TRADEMARK OFFICE
CERTIFICATE OF CORRECTION

PATENT NO. : 5,066,160

DATED : November 19, 1991

INVENTOR(S) : Ruey E. Wood, Jr.

It is certified that error appears in the above-identified patent and that said Letters Patent is hereby corrected as shown below:

Column 7, Line 60, Claim 1, delete "set" and insert --seat--.

Column 8, Line 50, Claim 7, delete "3" and insert --5--.

Column 9, Line 6, Claim 9, delete "sad" and insert --said--.

Signed and Sealed this

Second Day of March, 1993

*Attest:*

STEPHEN G. KUNIN

*Attesting Officer*     Acting Commissioner of Patents and Trademarks